United States Patent
Nøhr Christiansen

(10) Patent No.: US 12,169,033 B2
(45) Date of Patent: Dec. 17, 2024

(54) METHODS FOR CONTROLLING AND DIAGNOSING AN ACTUATOR FOR A LOW POWER SYSTEM

(71) Applicant: S-RAIN CONTROL A/S, Kvistgaard (DK)

(72) Inventor: Tom Nøhr Christiansen, Kvistgaard (DK)

(73) Assignee: S-RAIN CONTROL A/S, Kvistgaard (DK)

( * ) Notice: Subject to any disclaimer, the term of this patent is extended or adjusted under 35 U.S.C. 154(b) by 573 days.

(21) Appl. No.: 17/439,573

(22) PCT Filed: Mar. 12, 2020

(86) PCT No.: PCT/EP2020/056717
§ 371 (c)(1),
(2) Date: Sep. 15, 2021

(87) PCT Pub. No.: WO2020/187706
PCT Pub. Date: Sep. 24, 2020

(65) Prior Publication Data
US 2022/0154847 A1 May 19, 2022

(30) Foreign Application Priority Data
Mar. 15, 2019 (EP) .................................... 19163260

(51) Int. Cl.
*F16K 37/00* (2006.01)
*F16K 31/06* (2006.01)
*G05B 15/02* (2006.01)
*H01F 7/08* (2006.01)

(52) U.S. Cl.
CPC ...... *F16K 37/0041* (2013.01); *F16K 31/0644* (2013.01); *G05B 15/02* (2013.01); *H01F 7/081* (2013.01)

(58) Field of Classification Search
CPC .... B60T 8/36; F01L 9/20; F02D 41/20; F16K 37/0041; F16K 31/0644; G05B 15/02; H01F 7/081; H01F 7/18; H01F 7/1844
See application file for complete search history.

(56) References Cited

U.S. PATENT DOCUMENTS

| | | | |
|---|---|---|---|
| 10,113,287 B2 * | 10/2018 | Christiansen | ........... E02B 5/082 |
| 2015/0147119 A1 * | 5/2015 | Christiansen | ......... H01F 7/1877 405/37 |
| 2016/0291075 A1 * | 10/2016 | Sommansson | ...... F16K 37/0041 |
| 2017/0299080 A1 * | 10/2017 | Kanai | ................. F16K 31/0655 |
| 2019/0078700 A1 * | 3/2019 | Kanai | ....................... H01F 7/18 |

* cited by examiner

*Primary Examiner* — Jared Fureman
*Assistant Examiner* — Nicolas Bellido
(74) *Attorney, Agent, or Firm* — Taft Stettinius & Hollister LLP

(57) ABSTRACT

A method of controlling an actuator for a low power system, such as an irrigation system, where the actuator comprises a movable element and an electromagnetic coil for generating a magnetic field for displacing the movable element along the axis of the electromagnetic coil.

16 Claims, 7 Drawing Sheets

METHODS FOR CONTROLLING AND DIAGNOSING AN ACTUATOR FOR A LOW POWER SYSTEM

CROSS REFERENCE TO RELATED APPLICATIONS

This application is a U.S. national stage filing of International Patent Application No. PCT/EP2020/056717 filed Mar. 12, 2020, which claims priority to European Patent Application No. 19163260.3 filed Mar. 15, 2019, the contents of each application hereby incorporated by reference in their entirety.

FIELD OF THE INVENTION

The present invention relates to actuators for low power systems, such as a solenoid valve with a plunger for use in an irrigation system.

BACKGROUND OF THE INVENTION

Electronically controlled irrigation systems usually comprise a large number of solenoid valves, each of which make use of an electric current to generate a magnetic field and thereby manipulate a movable element, which in turn opens or closes a valve. In this way, electric power is converted to mechanical power.

In a plunger type solenoid valve, a current through an electromagnetic coil generates a magnetic field, which causes a plunger to move. The movement of the plunger either opens or closes a valve. If the valve is open, when the magnetic field is on, the valve is said to be "normally closed", whereas if the valve is closed, when the magnetic field is on, the valve is said to be "normally open".

For irrigation systems, the valves used are usually normally closed valves as most of the time, there is no flow of water. Still, for irrigation, the magnetic field must be on for an extended period of time, which requires an electric current to continually flow through the electromagnetic coil. Even for a low power system this can amount to a significant energy expenditure over time. Therefore, it would be advantageous to use a smaller amount of current. However, too little current used and the magnetic field generated is insufficient to hold the plunger in place causing the valve to close.

The movement of the plunger is sometimes detectable as a dip in the curve of the current through the electromagnetic coil measured as a function of time when a voltage is applied. After application of a voltage, the current through the electromagnetic coil will increase until it reaches a steady state current and often times a drop in the current through the electromagnetic coil occurs momentarily as the plunger moves towards or into the electromagnetic coil. However, the drop in current is sometimes too small to detect, making this detection of movement of the plunger unreliable.

If movement of the plunger can be detected with more certainty, the operation of the solenoid valve and detection of errors in same can be realised with more certainty. This will allow for an improved optimisation of the current needed to keep the valve open over an extended period of time.

Hence, an improved method of optimising the energy expenditure of an actuator such as a solenoid valve would be advantageous, and further an improved method for determining the status of a movable element in an actuator such as a solenoid valve would be advantageous.

OBJECT OF THE INVENTION

It is an object of the invention to provide an improved method for determining the status of a movable element in an actuator for low power systems such as a solenoid valve.

It is a further object of the invention to provide an improved method for optimisation of the energy expenditure of an actuator for low power systems such as a solenoid valve.

It may be seen as an object of the present invention to provide an alternative to the prior art that solves the above mentioned problems of the prior art.

SUMMARY OF THE INVENTION

Thus, the above described object and several other objects are intended to be obtained in a first aspect of the invention by providing a method of controlling an actuator for a low power system such as an irrigation system. The actuator comprises a movable element and an electromagnetic coil for generating a magnetic field that can displace the movable element along the axis of the electromagnetic coil. The movable element comprises a soft magnetic material, i.e. a material, which is easily magnetised by a magnetic field, but does not stay magnetised when the magnetic field is removed. When a voltage is applied to the electromagnetic coil, a current will run through the electromagnetic coil and generate a magnetic field. If the magnetic field is strong enough, the movable element will be pulled towards the electromagnetic coil. Thus, the actuator has an active state and a passive state, wherein the movable element is closer to the electromagnetic coil when in the active state than when the actuator is in the passive state.

The method of controlling an actuator for a low power system comprises the steps:
  applying a DC inrush voltage, $V_i$, to the electromagnetic coil such that a current runs through the electromagnetic coil, whereby the current running through the electromagnetic coil increases until it has reached a steady state current, $I_s$,
  optimising an operational hold voltage, $V_{oper}$, where optimising the operational hold voltage, $V_{oper}$, comprises the steps:
    a) applying a hold voltage, $V_h$, which is lower than the DC inrush voltage, $V_i$,
    b) applying the DC inrush voltage, $V_i$, to the electromagnetic coil,
    c) determining if the movable element moved from the passive state to the active state due to the magnetic field produced by the electromagnetic coil during application of the DC inrush voltage, $V_i$, in step b), wherein determining if the movable element moved from the passive state to the active state comprises the steps:
      retrieving a raise time $T_i$, where the raise time is the time it takes for the current through the electromagnetic coil, starting from substantially zero current, to reach an inrush current, $I_i$, where the inrush current is substantially equal to the steady state current, $I_s$, or the inrush current is lower than the steady state current,
      retrieving a hold current, $I_h$, where the hold current, $I_h$, is the steady state current through the electromagnetic coil, when the hold voltage, $V_h$, is applied to the electromagnetic coil, retrieving a hold current time, $T_h$, where the hold current time, $T_h$, is the time it takes for the current through the electromagnetic coil to go from substantially zero current to the hold current, $I_h$, when a voltage is applied to the electromagnetic coil, measuring a test raise time, $T_{test}$, where the test raise time, $T_{test}$, is the time it takes for the current through the electromagnetic coil to go from the hold current, $I_h$, and substantially to the inrush current, $I_i$, and determining that the movable element moved from the passive state to the active state or from the active state to the passive state if the sum of the hold current time, $T_h$, and the test raise time, $T_{test}$, is substantially equal to the raise time, $T_i$, i.e. if $T_h+T_{test} \approx T_i$, within a measurement uncertainty, d) repeating steps a)-c) to determine one or more values of the hold voltage, $V_h$, for which the movable element was determined not to have moved and, optionally, one or more values of the hold voltage, $V_h$, for which the movable element was determined to have moved upon subsequent application of the DC inrush voltage, $V_i$, e) selecting the operational hold voltage, $V_{oper}$, to have a value substantially equal to or higher than the lowest value of the hold voltage, $V_h$, for which it was determined that the movable element did not move upon subsequent application of the DC inrush voltage, $V_i$, f) applying the operational hold voltage, $V_{oper}$, to the electromagnetic coil to maintain the movable element in said active state.

For the method of controlling an actuator, the DC inrush voltage, $V_i$, being applied to the electromagnetic coil must be sufficient so as to generate a magnetic field large enough to move the movable element. A reasonable voltage to achieve this will be known for example from tests on similar actuators or from product specifications.

When the DC inrush voltage, $V_i$, is applied the current through the electromagnetic coil will increase until it reaches a steady state current, $I_s$, i.e. a current, which does not change substantially over time as long as the parameters affecting it, such as voltage applied and temperature, do not change.

In an embodiment, step e) in the method of controlling an actuator for a low power system further comprises selecting the operational hold voltage, $V_{oper}$, to be approximately 50 percent higher than the lowest value of the hold voltage, $V_h$, for which it was determined that the movable element did not move upon subsequent application of the DC inrush voltage, $V_i$.

The hold current time, $T_h$, may be measured at any suitable time. If measured at another step in the method, the value can be stored on a data storage medium from which the value of $T_h$ may then later be read. Thus, in an embodiment, retrieval of a hold current time, $T_h$, comprises reading values stored on a data storage medium, while in another embodiment retrieval of a hold current time, $T_h$, comprises measuring the hold current time, $T_h$.

Generally, when retrieving a value, such as e.g. a time or a current, it may be measured or read from a data storage medium.

In an embodiment, the method further comprises a step of determining the resistance of the electromagnetic coil, $R_{coil}$.

In another embodiment, the resistance of the electromagnetic coil is assumed to be ohmic, i.e. linear. For an electromagnetic coil an applied voltage and the resultant steady state current are used to calculate its ohmic resistance.

In an embodiment, the actuator is a solenoid valve and the movable element is a plunger or piston.

In a further embodiment, the solenoid valve is part of an irrigation system.

The described objects of the invention and several other objects are intended to be obtained in a second aspect of the invention by providing a method of diagnosing an actuator for a low power system, such as an irrigation system. The actuator comprises a movable element and an electromagnetic coil for generating a magnetic field for displacing the movable element along the axis of the electromagnetic coil. The movable element comprises a soft magnetic material, i.e. a material, which is easily magnetised by a magnetic field, but does not stay magnetised when the magnetic field is removed. When a voltage is applied to the electromagnetic coil, a current will run through the electromagnetic coil and generate a magnetic field. If the magnetic field is strong enough, the movable element will be pulled towards the electromagnetic coil. Thus, the actuator has an active state and a passive state, wherein the movable element is closer to the electromagnetic coil when in the active state than when the actuator is in the passive state. A hold voltage, $V_h$, which is a constant DC voltage, is applied to the electromagnetic coil. The method of diagnosing an actuator for a low power system comprises the following steps:

measuring a hold current, $I_h$, through the electromagnetic coil, the hold current, $I_h$, being the steady state current running through the electromagnetic coil when the hold voltage, $V_h$, is applied, retrieving values characterising the electromagnetic coil and the movable element:
  a DC inrush voltage, $V_i$, and a corresponding raise time, $T_i$,
  an inrush current, $I_i(V_i, T_i, R)$, being dependent on the DC inrush voltage, $V_i$, the raise time, $T_i$, and the resistance, $R$, of the electromagnetic coil, where the inrush current, $I_i$, is the current running through the electromagnetic coil after the DC inrush voltage, $V_i$, has been applied to the electromagnetic coil for a time, $T_i$, from a time when substantially zero voltage was applied to the electromagnetic coil,
  a hold current time, $T_h$, where the hold current time, $T_h$, is the time it takes for the current through the electromagnetic coil to go from substantially zero current to the hold current, $I_h$, applying the retrieved DC inrush voltage, $V_i$, to the electromagnetic coil, while measuring the current through the electromagnetic coil as a function of time, determining a test raise time, $T_{test}$, being the time it takes for the current through the electromagnetic coil to reach substantially the retrieved value of the inrush current, $I_i$, calculating a total raise time, $T_{raise,total}$, as the sum of the hold current time, $T_h$, and the measured test raise time, $T_{test}$, such that $T_{raise,total}=T_h-T_{test}$, determining if the total raise time $T_{raise,total}$ is greater than or substantially equal to the raise time, $T_i$, within a measurement uncertainty, and if so, reporting that the movable element moved due to the application of the retrieved DC inrush voltage, $V_i$, to the electromagnetic coil.

For the method of diagnosing an actuator, the DC inrush voltage, $V_i$, being applied to the electromagnetic coil must be sufficient so as to generate a magnetic field large enough to move the movable element. A reasonable voltage to achieve this will be known for example from tests on the actuator or similar actuators or from product specifications.

In an embodiment, the actuator is a solenoid valve and the movable element is a plunger or piston.

In a further embodiment, the solenoid valve is part of an irrigation system.

In an embodiment, retrieval of values characterising the electromagnetic coil and the movable element in step b) comprises reading one or more values stored on a data storage medium.

In another embodiment, retrieval of values characterising the electromagnetic coil and the movable element in step b) comprises measuring one or more values.

In a further embodiment, the method further comprises the step:
reporting to a system or a user whether the movable element moved or not.

The present invention also relates to a method of controlling an actuator for a low power system, such as an irrigation system, comprising a movable element and an electromagnetic coil for generating a magnetic field for displacing said movable element along the axis of said electromagnetic coil, said movable element comprising a magnetic material, said actuator having an active state and a passive state, said movable element being closer to said electromagnetic coil when said actuator being in said active state than when said actuator being in said passive state where the active state is obtained by applying a DC voltage to said electromagnetic coil;
the method comprises the step
1) applying a first DC voltage to said electromagnetic coil such that a current runs through said electromagnetic coil, said current being sufficient to bring the actuator from the passive state to the active state,
2) applying a DC voltage lower than said first DC voltage and determine if the movable element moves, bringing the actuator from the active state towards the passive state
3) repeating step 2) and determine a number of second DC voltages lower than said first DC voltage where the movable element does not move such that the actuator remains in the active state,
4) selecting and applying at least one of the second voltages to keep the actuator in the active state, The method provides a further method for optimising the energy expenditure of an actuator such as a solenoid valve, and further an improved method for determining the status of a movable element in an actuator such as a solenoid valve.

The described objects of the invention and several other objects are intended to be obtained in a third aspect of the invention by use of the method of controlling an actuator comprising a movable element and an electromagnetic coil as described above for controlling an irrigation valve comprising a solenoid and a piston.

BRIEF DESCRIPTION OF THE FIGURES

The methods according to the invention will now be described in more detail with regard to the accompanying figures. The figures show one way of implementing the present invention and is not to be construed as being limiting to other possible embodiments falling within the scope of the attached claim set.

DETAILED DESCRIPTION

Figure 1A:
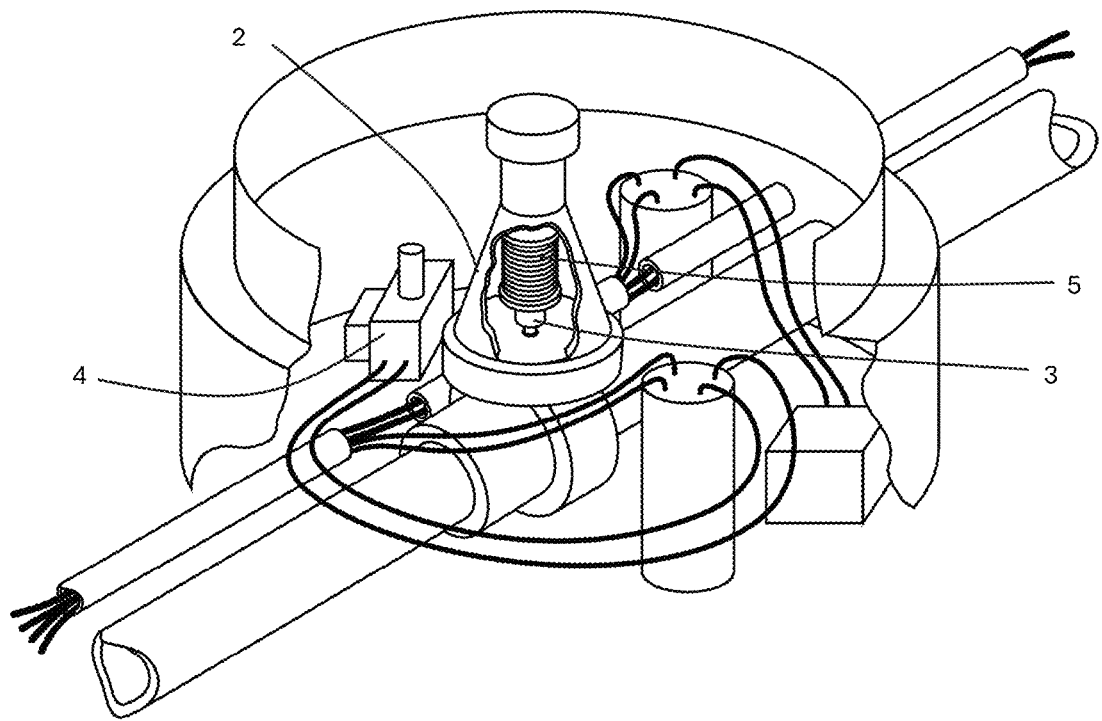
FIG. 1a shows a schematic of an irrigation control unit.

FIG. 1a shows a schematic of an irrigation control unit comprising a controllable irrigation valve 2, which is connected to a connector box 4. A solenoid or actuator 5, i.e. an electromagnetic coil 5, inside the connector box 4 controls a movable element 3 such as a plunger or piston 3, which determines whether the valve is open or closed. By causing a current to run through the electromagnetic coil, a magnetic field is generated along the axis of the coil. The plunger comprises a soft magnetic material and a sufficiently large magnetic field will pull the plunger towards the coil in the direction along the axis of the coil causing a change in the state of the valve. In a normally closed valve moving the plunger will open the valve such that fluid flows through the valve in the pipeline 6. When the magnetic field is removed, the plunger will return to the "normal" state, i.e. in a normally closed valve, removal of the magnetic field will cause the valve to close.

Figure 1B:
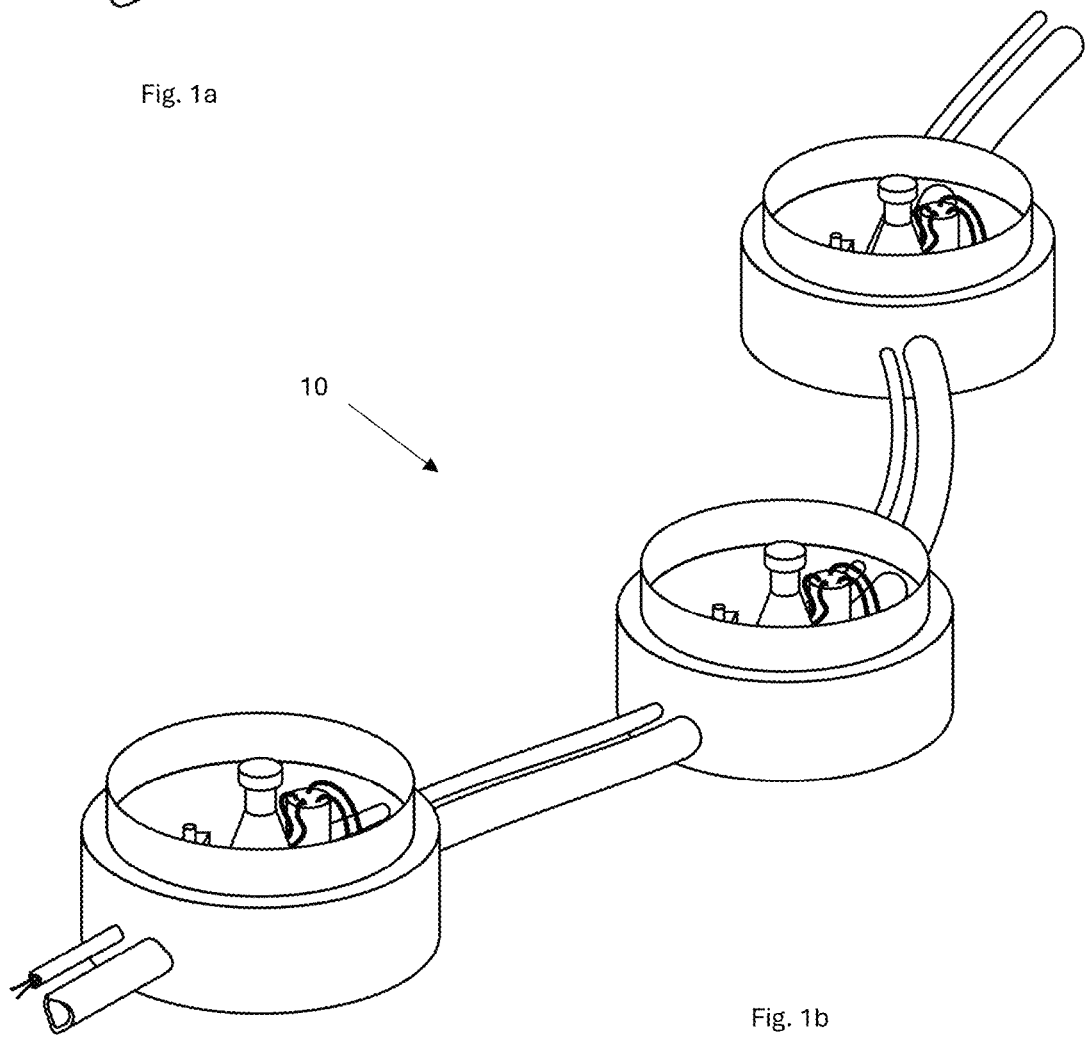
FIG. 1b shows an example of an irrigation system.

In an irrigation system 10 comprising a large number of normally closed solenoid valves 2, current is run through the electromagnetic coil of a given valve to open that valve. The amount of current needed to open a given valve, i.e. the amount needed to generate a sufficiently large magnetic field to move the plunger, is either known or may be experimentally determined. An example of an irrigation system including controllable irrigation valves or normally closed solenoid valves, is shown in FIG. 1b.

A voltage will need to be applied continuously for the duration of the irrigation. To save energy and money, it is beneficial to use as low a current as possible to maintain a normally closed valve in its open position. Once the valve has been opened by application of an inrush voltage, $V_i$, to the electromagnetic coil, the voltage may be lowered to a hold voltage, $V_h$. If the hold voltage, $V_h$, is large enough, it will maintain the valve in its open position for the period of time, where irrigation is desired.

Figure 2:
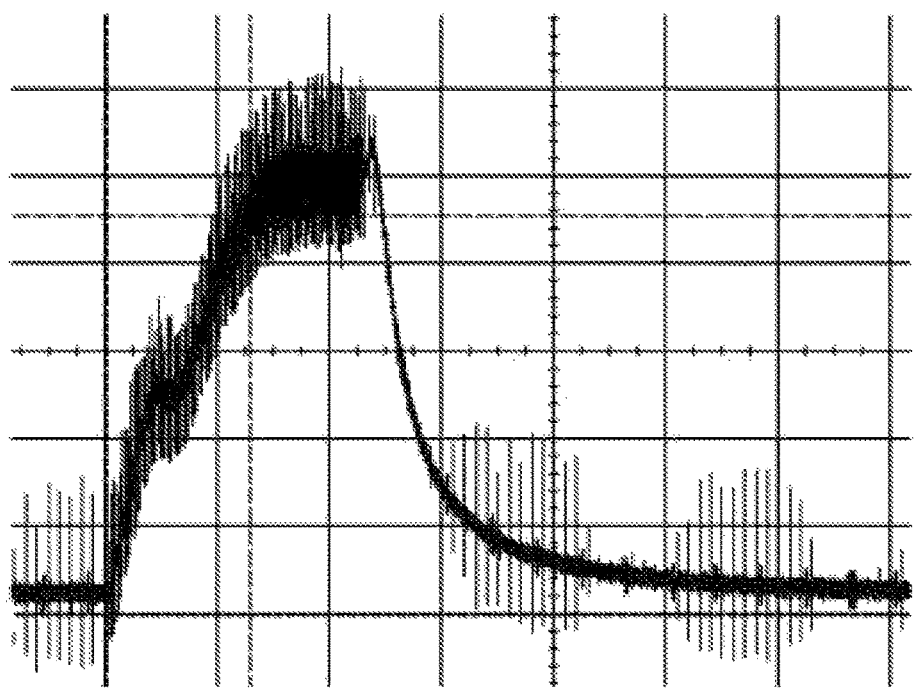
FIG. 2 shows an experimental measurement of the current through an electromagnetic coil in a solenoid valve during a time period, where an inrush voltage is applied, the plunger moved and the voltage was subsequently no longer applied.
Figure 3:
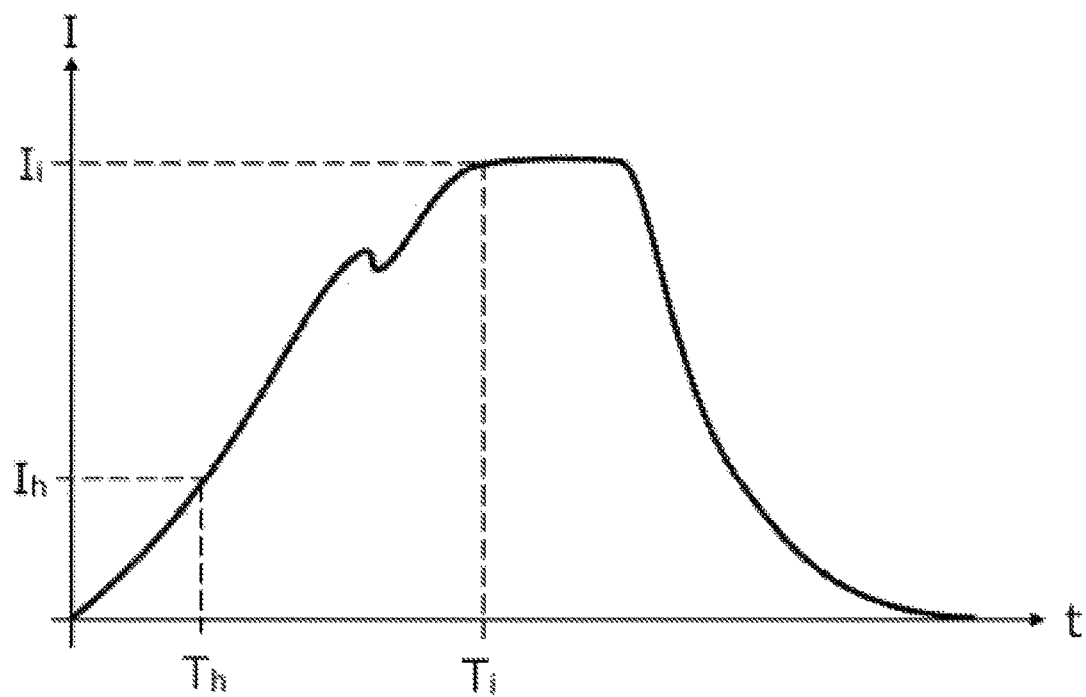
FIG. 3 shows a schematic graph of a measurement such as the one shown in FIG. 2.

The current through the electromagnetic coil may be measured as a function of time. An example of such a measurement is shown in FIG. 2, while a generalised graph of this kind of measurement is shown in FIG. 3. As seen in FIGS. 2 and 3, the current rises sharply as an inrush voltage, $V_i$, is applied. The magnetic field generated by the electromagnetic coil will pull on the plunger, which comprises a soft magnetic material. When the generated magnetic field is sufficiently large, the pull on the plunger is strong enough to move the plunger towards the coil. As the plunger moves, a back-emf will be induced in the coil causing a reduction of the voltage over the coil. Often this will cause a discernible drop in the current through the coil, until the plunger finishes moving. However, the effect of the back-emf on the current is sometimes not detectable as a drop in the current such as the dip shown in FIGS. 2-5, thus making it impossible to use such a dip to detect movement of the plunger in those instances; Rather the current will simply rise more slowly.

The current through the coil will continue rising until reaching its steady state current. The steady state current is a current, which does not change substantially over time as long as the parameters affecting it, such as voltage applied and temperature, do not change. In the measurement shown in FIG. 2, the applied voltage is removed after some time resulting in the current through the coil dropping off. No matter whether the movement of the plunger causes a discernible dip or the current simply rises more slowly, the time it takes for the current to reach its steady state value is longer if the plunger is moved by the magnetic field generated by the coil.

In FIG. 3 two values of current and their corresponding time are indicated. The raise time, $T_i$, is the time it takes for the current through the electromagnetic coil, starting from substantially zero current, to reach an inrush current, $I_i$. The inrush current may be substantially equal to the steady state current or the inrush current may be lower than the steady state current, but preferably the inrush current should be chosen such that it may be assumed (or known from testing) that the plunger has finished moving during the raise time, $T_i$.

A measurement such as the one shown in FIG. 2, can be used to record corresponding values of time and current (I, T) from substantially zero current to the steady state current for a given applied voltage. This measurement may be used in a method, as presented herein, to determine whether the valve was open or closed at a given time by determining the status of the plunger.

Figure 4:
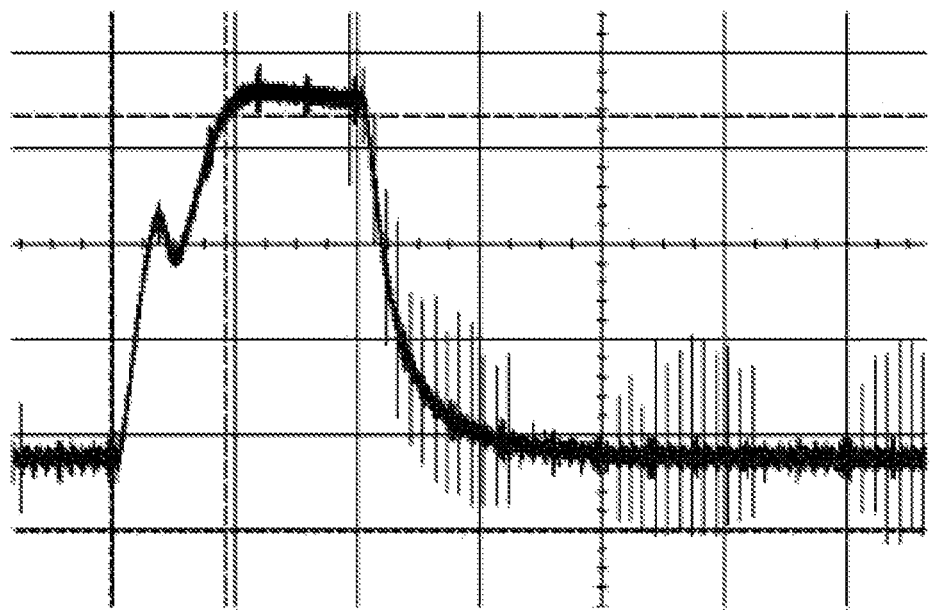
FIG. 4 shows an experimental measurement of the current through an electromagnetic coil in a solenoid valve, where a hold voltage is applied initially, and an inrush voltage is applied, the plunger moved and the voltage was subsequently no longer applied.

FIG. 4 shows a measurement of the current through the electromagnetic coil as a function of time similar to the measurement in FIG. 2. In FIG. 4, however, a hold voltage, $V_h$, is applied to the electromagnetic coil at the beginning of the measurement such that a hold current, $I_h$, is running through the coil. The hold voltage, $V_h$, is applied following an inrush voltage, $V_i$, having been applied to the coil, where the magnetic field generated as a result of the inrush voltage, $V_i$, has moved the plunger towards the coil. If the magnetic field generated by the hold current, $I_h$, is large enough it will maintain the position of the plunger, i.e. a normally closed valve will remain in an open position. However, if the magnetic field is not large enough, the plunger will move away from the electromagnetic coil thus closing the valve.

Figure 5:
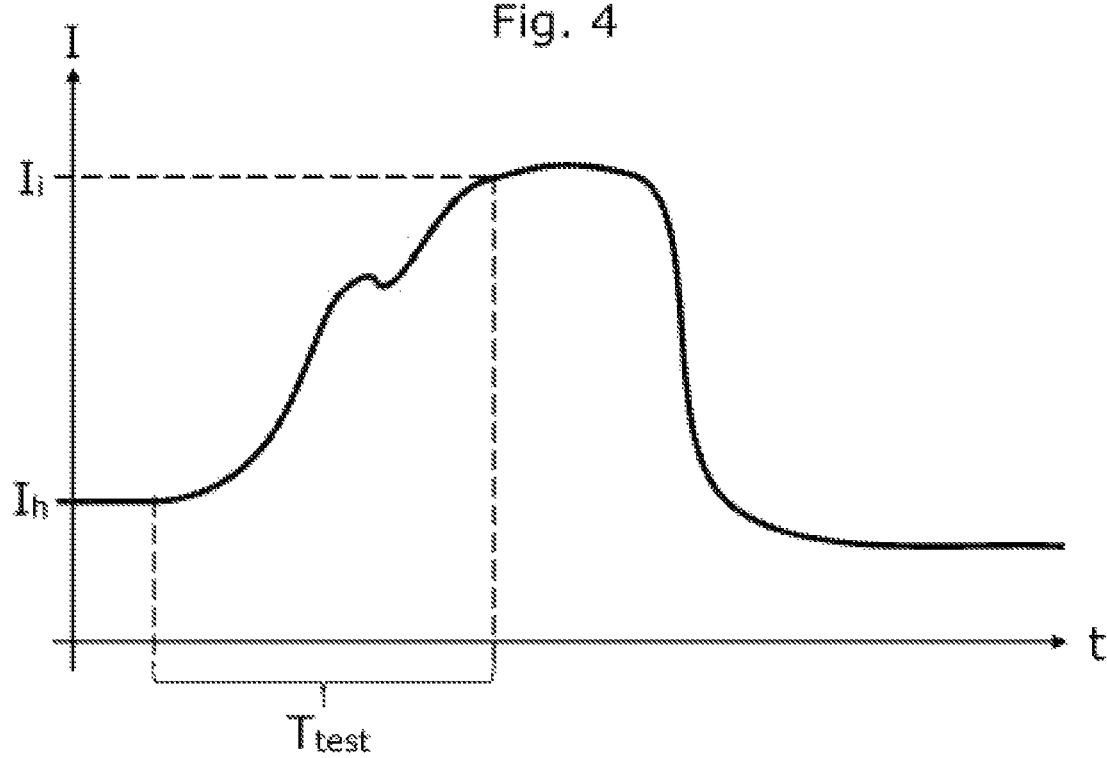
FIG. 5 shows a schematic graph of a measurement such as the one shown in FIG. 4.

To determine the status of the plunger, an inrush voltage, $V_i$, (which is larger than the hold voltage) is applied to the coil, which will cause the current through the coil to increase as shown in FIGS. 4 and 5. The inrush voltage applied is known to be sufficient to cause the plunger to move and a measurement of a number of corresponding values of time and current (I, T) from substantially zero current to the steady state current for the applied inrush voltage has been recorded previously.

When applying the inrush voltage, $V_i$, the test raise time, $T_{test}$, from application of the inrush voltage, $V_i$, until the time the current through the electromagnetic coil is substantially equal to an inrush current, $I_i$, is measured as shown in FIG. 5. From a measurement of a number of corresponding values of time and current (I, T) for the applied inrush voltage, the hold current time, $T_h$, is known, see FIG. 3, where the hold current time, $T_h$, is the time it takes for the current through the electromagnetic coil to go from substantially zero current to the hold current, $I_h$, when the inrush voltage, $V_i$, is applied to the coil. A total raise time, $T_{raise, total}$ can be calculated as the sum of the values of $T_{test}$ and $T_h$, i.e. $T_{raise, total} = T_{test} + T_h$.

If the plunger was moved towards the coil by the magnetic field generated as a result of the application of the inrush voltage, $V_i$, this means that the hold voltage, $V_h$, was not large enough to generate a magnetic field sufficient to hold the plunger in its position closer to the coil. Whether the plunger moved, when the inrush voltage, $V_i$, was applied may be known by comparing the total raise time, $T_{raise, total}$ with the raise time $T_i$ measured as shown in FIG. 3. If $T_{raise, total}$ is substantially equal to the raise time, $T_i$, within a measurement uncertainty, then the plunger moved when the inrush voltage, $V_i$, was applied. If, however, the total raise time $T_{raise, total}$ is significantly smaller than the raise time, $T_i$, then the plunger did not move as this means the current through the coil was not "held back" by the back-emf induced by the movement of the plunger. When no energy is expended to move the plunger, as in the case of an inrush voltage applied during a state where the plunger was already in its position closer to the electromagnetic coil, the current through the coil reaches the value of the inrush current, $I_i$, faster.

Thus, the measurement of the time it takes for the current through the electromagnetic coil to reach the inrush current, $I_i$, can be used to determine whether a hold voltage, $V_h$, was large enough to maintain the valve in an open position. A hold voltage, which is large enough to keep the valve open and small so as to save energy, may be determined by applying different hold voltages, $V_h$, after the inrush voltages, $V_i$, and determining whether they were sufficient to hold the plunger.

Figure 6A:
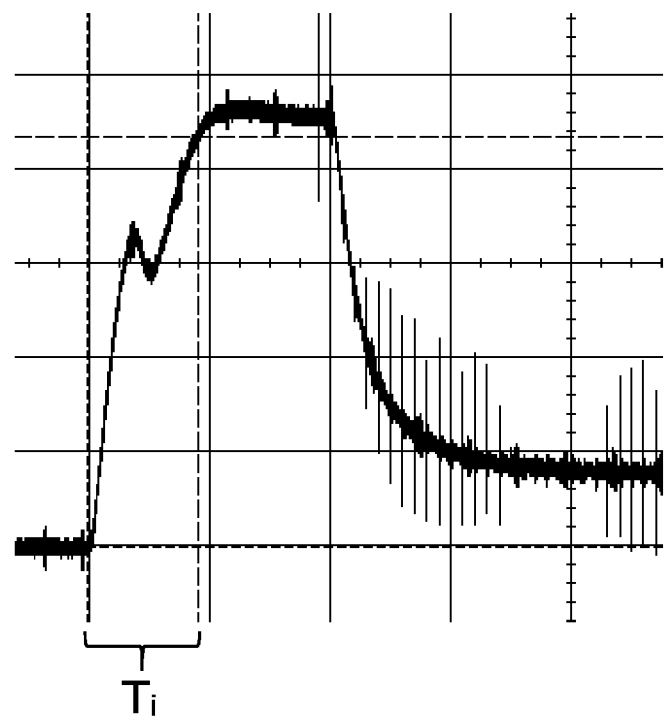
FIGS. 6a and 6b both show an experimental measurement of the raise time, $T_r$. In one measurement the plunger is unable to move.
Figure 6B:
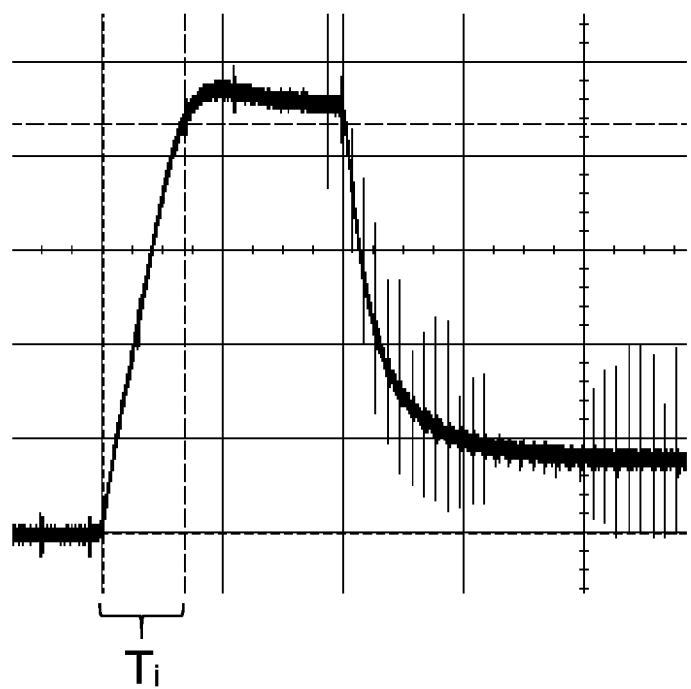

In FIGS. 6a and 6b are shown experimental measurements of the raise time, $T_i$, illustrating the difference in raise time, $T_i$, when the plunger moves (FIG. 6a) versus when the plunger does not move (FIG. 6b). In the experiments, the same inrush voltage was applied, but the plunger was unable to move during the measurement shown in FIG. 6b. As explained above, the raise time, $T_i$, increases if the plunger moves during application of an inrush voltage and this is clearly seen when comparing the experimental data shown in FIGS. 6a and 6b.

Figure 7:
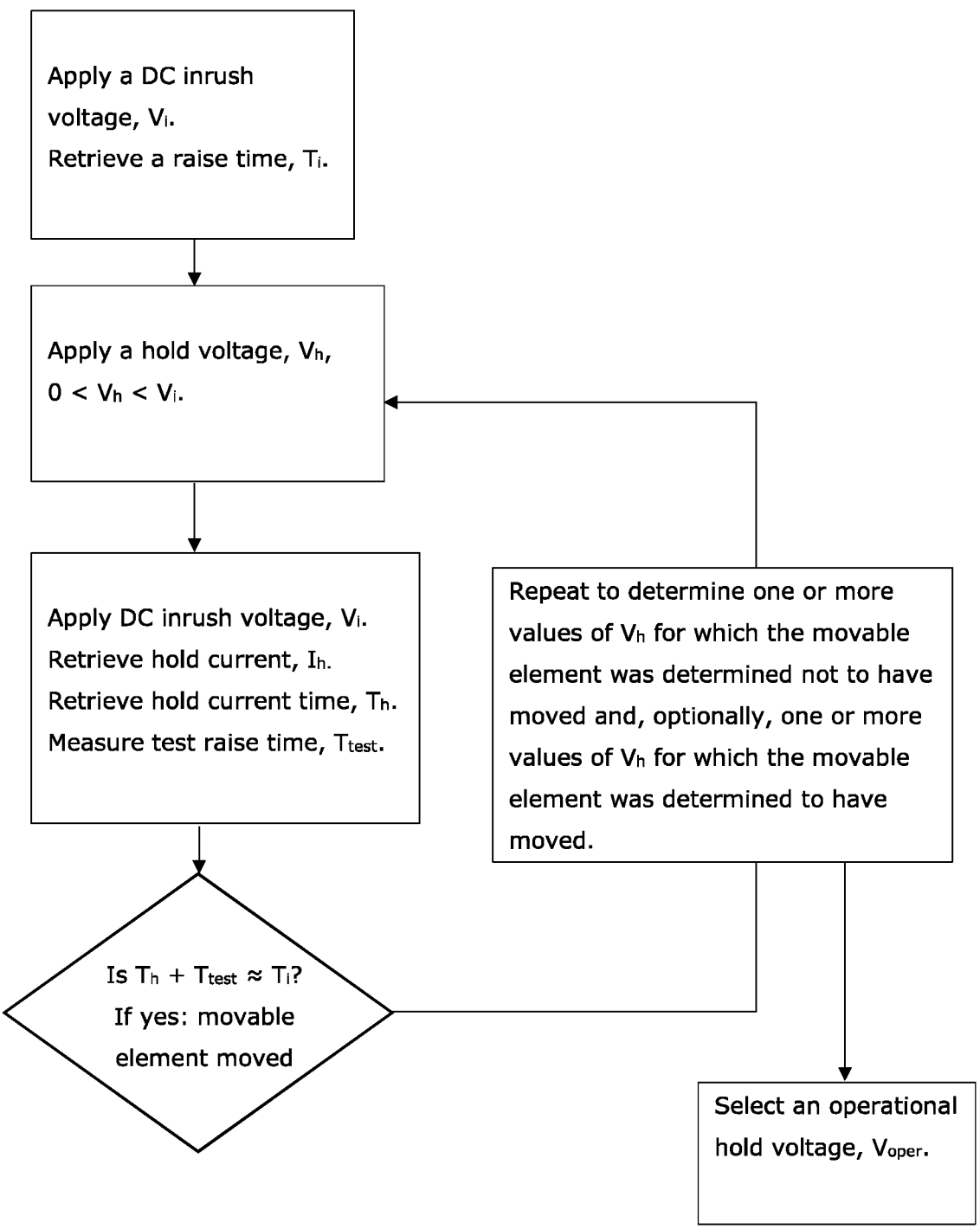
FIG. 7 shows a flow-chart of a method of controlling an actuator for a low power system according to the invention.

An optimization of the hold voltage by utilisation of the method described herein may be done using different optimization methods to choose the hold voltages, $V_h$, to be tested. A flow chart of the method is shown in FIG. 7.

Figure 8:
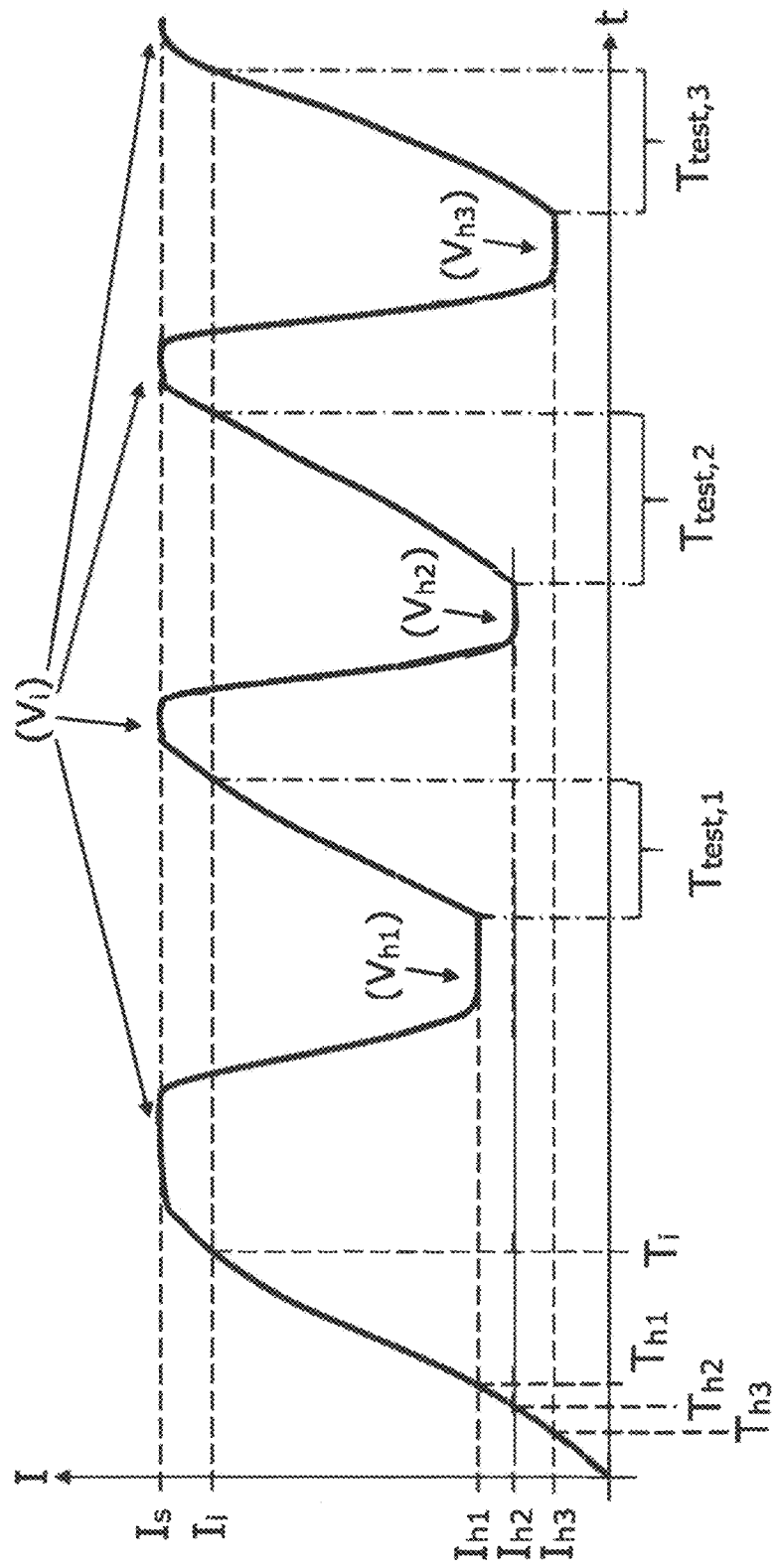
FIG. 8 shows a schematic graph of the current through an electromagnetic coil versus time as the hold voltage, $V_h$, is being optimised.

In FIG. 8 is shown a schematic drawing of a series of measurements of the current through an electromagnetic coil in a solenoid valve, while different values of hold voltages are tested. Initially, the current through the coil is substantially zero until the inrush voltage, $V_i$, is applied. When the magnetic field generated by the current through the coil is sufficiently large, the plunger will move to its position closer to the coil. While the current through the coil increases, values of current and time, (I, T), may be recorded, but these values may also be known from a previous measurement. The time it takes for the current through the coil to reach an inrush value, $I_i$, when starting from substantially zero current is the raise time, $T_i$.

A suitable inrush voltage to use may be determined by first determining the resistance of the electromagnetic coil either by one or more measurements or by reference to known values such as by reading a stored value of resistance from a chart based on a measured temperature of the surroundings of the electromagnetic coil.

Following the current having reached its steady state value, $I_s$, a first hold voltage, $V_{h1}$, which is lower than the inrush voltage, $V_i$, is applied, as shown in FIG. 8, causing the current through the coil to decrease to a new steady state value, $I_{h1}$. The first, and any subsequent, hold voltage, $V_h$, may preferably be selected to be substantially equal to or less than 1/20 of the inrush voltage, $V_i$.

By measuring the values of current and time, (I, T) as well as the raise time, $T_i$, at the beginning of an activation of a solenoid valve, the temperature changes in the electromagnetic coil during the relatively short period of time, where the valve is open, will be minimal. This is in part due to very little power being deposited in the electromagnetic coil, which usually comprises copper as conductive material. This means that the measurements done at activation can reliably be used for comparison with measurements during the activation.

To determine whether the first hold voltage, $V_{h1}$, is sufficient to maintain the position of the plunger, the inrush voltage is applied to the coil once again and the test raise time, $T_{test,1}$, is measured. After application of the inrush voltage, $V_i$, at a time, where the first hold voltage, $V_{h1}$, was applied to the coil, the time, $T_{test,1}$, it takes for the current to reach the inrush value, $I_i$, is less when the inrush voltage, $V_i$, is applied at a time when the current through the coil is substantially zero. However, we know from the measurement of the corresponding values of current and time, (I, T), how long time it took for the current through the coil to reach the value $I_{h1}$ when starting from substantially zero current; this hold current time is denoted $T_{h1}$ in FIG. 8.

A total raise time, $T_{raise,total}$, can now be calculated as the sum of the hold current time, $T_{h1}$, and the measured test raise time, $T_{test,1}$, such that $T_{raise,total} = T_{h1} + T_{test,1}$. If the total raise time, $T_{raise,total}$, is substantially equal to the raise time, $T_i$, then the plunger moved, when the inrush voltage, $V_i$, was applied at a time when the first hold voltage, $V_{h1}$, was applied and it can be concluded that the first hold voltage, $V_{h1}$, was insufficient to maintain the plunger in its position closer to the electromagnetic coil. In this case, a second hold voltage, $V_{h2}$, is chosen to be higher than the first hold voltage, $V_{h1}$.

In the schematic drawing shown as FIG. 8 it was concluded that the first hold voltage, $V_{h1}$, was sufficient to hold the plunger in position closer to the coil and a second, lower, hold voltage, $V_{h2}$, is applied. The same method as described above is used to determine whether the second hold voltage, $V_{h2}$, is sufficient to hold the plunger in position closer to the coil, by measuring a test raise time, $T_{test,2}$, and knowing the hold current time, $T_{h2}$, from a measurement so that a total raise time, $T_{raise,total}$, may be calculated and compared with the raise time, $T_i$. This procedure may be repeated a number of times to determine one or more values of hold voltages, $V_h$, for which the plunger was determined not to have moved and, optionally, one or more values of hold voltages, $V_h$, for which the plunger was determined to have moved.

Following this, an operational hold voltage, $V_{oper}$, can be selected as a value of voltage substantially equal to or higher than the lowest value of the hold voltage, $V_h$, for which it was determined that the plunger did not move upon subsequent application of the inrush voltage, $V_i$. This operational hold voltage, $V_{oper}$, may then be applied to the electromagnetic coil following an inrush voltage, $V_i$, to maintain the plunger in its position closer to the coil. In practice, one would not necessarily choose the lowest hold voltage found to maintain the plunger in its position, but a higher value. For example, the operational hold voltage, $V_{oper}$, may be chosen to be 50 percent higher than the lowest value of hold voltage found to maintain the plunger in its position closer to the coil. Even so, a significant reduction in energy expenditure can be realised. It may also be relevant to test whether a lower value, e.g. 20 percent lower, of the inrush voltage, $V_i$, will result in an inrush, i.e. in the plunger moving, to ensure that the inrush voltage used in practice is more than sufficient under the conditions at the time of the test.

At least one hold voltage for which the plunger was determined not to have moved upon the subsequent application of the DC inrush voltage is determined. Optionally, one or more values of the hold voltage for which the plunger was determined to have moved may also be determined. This will depend on the system, the hold voltages tested and the foregoing knowledge of the system.

The process of optimisation as disclosed herein may take as little time as a second or less. A limitation with respect to how fast the process can be performed is that between applying different voltages time must be allowed for the system to "catch up". This means, for example, that between applying a hold voltage and subsequently an inrush voltage a wait time is incorporated as should be common knowledge for a skilled person.

In practice, one may choose to use the steady state value, $I_s$, or a lower current than the steady state value, $I_i$, as the inrush current, $I_i$, against which to determine a corresponding raise time value, $T_i$. For example, the inrush current, $I_i$, could be 80 percent of the steady state current, $I_s$. If a computer algorithm is used to determine when the current through the electromagnetic coil has reached the inrush current value, $I_i$, care must be taken due to the possibility of the plunger moving at a time when the current through the coil is close to the inrush voltage and this causes a dip in the curve of the current as a function of time. In that situation, the algorithm may determine that the inrush current value is reached much earlier than it actually is due to the dip. To reduce the chance of this happening, it is advantageous for the algorithm to search for the time when the inrush current is reached from "right to left", when looking at data such as those shown in FIGS. 2 and 4.

The method has been tested on solenoid valves for use in irrigation systems and the energy saving achieved by the use of an operational hold voltage determined using the method disclosed herein to maintain an open valve has been surprisingly large. The more decoders are activated, the more energy is required and the more the system is then limited in energy. Thus, an optimization done according to the method disclosed herein allows for activation of more decoders as each use less energy.

If the plunger is not able to move, i.e. the solenoid valve is defective, or if the inrush voltage, $V_i$, used is too low, the method will not work. In that case, the result will be that the total raise time is always substantially equal to the inrush time. Thus, it will appear as if, no matter how low a hold voltage is applied it will be sufficient to hold the plunger in its position closer to the electromagnetic coil, while in reality, the plunger did not move when the raise time $T_i$ was measured. Therefore, the method may also be used to determine whether a solenoid valve is defective.

Figure 9:
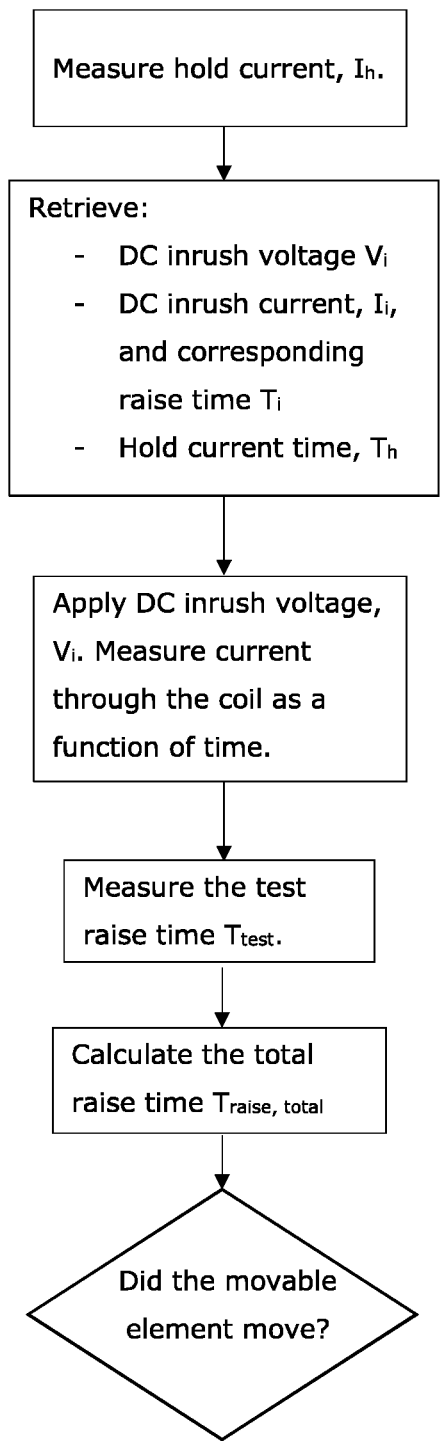
FIG. 9 shows a flow-chart of a method of diagnosing an actuator for a low power system according to the invention.

Calculation of a total raise time, $T_{raise,total}$, and comparison with a known raise time, $T_i$, may also be used to diagnose an actuator. In this case, we are interested in determining whether the actuator was in its active state, that is, whether its movable element, such as a plunger, was in its position closer to the electromagnetic coil, while a hold voltage was applied to the coil. We determine this by the method described herein and concluding based on it whether the plunger moves when an inrush voltage, $V_i$, is applied. A flow chart of the method of diagnosing an actuator is shown in FIG. 9. If the applied inrush voltage, $V_i$, is known to be large enough to move the plunger, save for the plunger being defective, then a determination that the plunger did not move, means that the actuator was in its active state. If the hold voltage applied to the electromagnetic coil was not sufficient and the actuator was therefore in its passive state then the method will show that the plunger moved, when the inrush voltage, $V_i$, was applied; Again, unless the plunger is defective, which can be tested for by applying a hold voltage known to be too low to maintain the plunger in its position closer to the electromagnetic coil—if the test raise time indicates that the plunger was held in its position closer to the electromagnetic coil even though this is known not to be the case then the plunger is defective.

In FIG. 9 is shown a flow chart of the method of diagnosing an actuator for a low power system such as an irrigation system. The actuator comprises a movable element and an electromagnetic coil. In an irrigation system the actuator could be a solenoid valve, wherein the movable element is a plunger (also called a piston). In an irrigation system the solenoid valves will usually be normally closed valves as described above. The method of diagnosing the solenoid valve is used when a hold voltage, $V_h$, is applied to the electromagnetic coil and it is desired to know the status of the valve such as to know if the valve is open or if the valve is defective.

To diagnose the valve, wherein the electromagnetic coil has a hold voltage, $V_h$, applied to it, the hold current, $I_h$, through the electromagnetic coil is measured. From a measurement or from a previously done measurement are retrieved a number of values characterising the electromagnetic coil and the plunger. These values are: an inrush voltage, $V_i$, a corresponding raise time, $T_i$, an inrush current, $I_i(V_i, T_i, R)$, and a hold current time, $T_h$.

The inrush current, $I_i(V_i, T_i, R)$, is dependent on the inrush voltage, $V_i$, the raise time, $T_i$, and the resistance, R, of the electromagnetic coil. Thus, the resistance of the electromagnetic coil when the method of diagnosis is performed will need to be comparable to the resistance of the coil when the inrush current, $I_i$, was measured. The inrush current, $I_i$, is the current running through the electromagnetic coil after the inrush voltage, $V_i$, has been applied to the electromagnetic coil for a time, $T_i$, from a time when substantially zero voltage was applied to the electromagnetic coil, see FIG. 3.

The hold current time, $T_h$, is obtained from a measurement of the current through the electromagnetic coil as a function of time, where the hold current time, $T_h$, is the time it takes for the current through the electromagnetic coil to go from substantially zero current to the hold current, $I_h$, where the hold current, $I_h$, is the steady state current through the electromagnetic coil when the hold voltage, $V_h$, is applied to the electromagnetic coil, see FIG. 3.

The inrush voltage, $V_i$, is applied to the electromagnetic coil and the current through the coil is measured as a function of time. From this measurement, the time it takes for the current through the electromagnetic coil to reach the retrieved value of inrush current, $I_i$, can be determined; this is the test raise time, $T_{test}$. From the hold current time, $T_h$, and the test raise time, $T_{test}$, a total raise time, $T_{raise, total}$, can be calculated as the sum of the two, i.e. $T_{raise,total}=T_h+T_{test}$.

If the test raise time, $T_{raise, total}$, is substantially equal to the raise time, $T_i$, it may be concluded that the plunger moved and that the valve was therefore closed, if it is a normally closed valve, even though a hold voltage, $V_h$, was applied, i.e. the hold voltage, $V_h$, applied was insufficient to hold the plunger in its position closer to the electromagnetic coil.

In the case of a solenoid valve being used in an irrigation system the solenoid valve is activated for a relatively short period of time. During that time, a hold voltage, $V_h$, is applied to maintain the plunger in its position closer to the electromagnetic coil such that the valve is open and water is flowing through the valve. Using the method as described above, an inrush voltage may be applied during the period of time where the valve is active and the calculated test raise time, $T_{raise, total}$, must be shorter than the initially recorded raise time, $T_i$. If not, an error has occurred. Either the plunger moved away from its position closer to the coil due to the hold voltage, $V_h$, being too low or the plunger was stuck at the beginning of the activation and therefore never moved. The test may also be performed at the end of the irrigation, when the valve is to be deactivated, to determine whether an error occurred during the irrigation period.

The method of comparing a test raise time with a raise time may also be used to test whether the actuator has become defective in such a way that the movable element cannot move. A raise time, $T_i$, corresponding to an inrush voltage, $V_i$, and an inrush current, $I_i$, must all be known from a measurement, where the actuator was in working order. By repeating the measurement of the raise time (under conditions where the resistance of the electromagnetic coil can be assumed to be substantially the same), i.e. by measuring the time it takes for the current through the electromagnetic coil to reach the inrush current, $I_i$, the measured raise time should be substantially the same as the previously measured raise time. If the measured raise time is lower than the previously measured raise time then the movable element did not move during the new measurement and it may be concluded that the actuator has become defective.

That the measurement must be compared with data recorded under conditions where the resistance of the electromagnetic coil can be assumed to be substantially the same poses a restriction. For example, the resistance of copper (Cu) changes approximately 0.4% per degree Centigrade near room temperature, so care must be taken, when selecting data from a previous measurement to compare with.

The methods have been described for normally closed solenoid valves, wherein the movable element is a plunger, but the method is useful for all types of transducers comprising an electromagnetic coil, which may cause something to move. For instance, the method may be used with relays activated by a pawl being tilted by the magnetic field generated by an electromagnetic coil.

The methods lend themselves easily to be implemented in an automated irrigation system having a computerized system with algorithms to control and/or diagnose the solenoid valves. The placement of the decoders, which operate the solenoid valves, and the irrigation control units determines the possible maximum values of the inrush voltage, $V_i$. Most important parameters are the output voltage and current limitation of the control unit, and the wire resistance between the decoder and the solenoid valve. All of these parameters can be taken into consideration in the algorithms such that the parameters known for the individual decoder-solenoid pair are useable once the system is running.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

$V_i$ DC inrush voltage/inrush voltage
$T_i$ Raise time
$I_s$ Steady state current
$I_i$ Inrush current
$V_{oper}$ Operational hold voltage
$V_h$ Hold voltage
$I_h$ Hold current
$T_h$ Hold current time
$T_{test}$ Test raise time
$T_{raise,total}$ Total raise time
$R_{coil}$ Resistance of the electromagnetic coil

The invention claimed is:

1. A method of controlling an actuator for an irrigation system, comprising a movable element and an electromagnetic coil for generating a magnetic field for displacing said movable element along the axis of said electromagnetic coil, said movable element comprising a magnetic material, said actuator having an active state and a passive state, said movable element being closer to said electromagnetic coil when said actuator being in said active state than when said actuator being in said passive state, said method comprising the steps:

applying a DC inrush voltage, $V_i$, to said electromagnetic coil such that a current runs through said electromagnetic coil, whereby the current running through said electromagnetic coil increases until it has reached an inrush steady state current, $I_s$, optimizing an operational hold voltage, $V_{oper}$, where optimizing said operational hold voltage, $V_{oper}$, comprises the steps:

a) applying a hold voltage, $V_h$, which is lower than said DC inrush voltage, $V_i$, b) applying said DC inrush voltage, $V_i$, to said electromagnetic coil, c) determining when said movable element moved from said passive state to said active state due to the magnetic field produced by said electromagnetic coil during application of said DC inrush voltage, $V_i$, in step b), wherein determining when said movable element moved from said passive state to said active state comprises the steps:

retrieving a raise time $T_i$, where said raise time is the time it takes for the current through said electromagnetic coil, to reach an inrush current, $I_i$, where said inrush current is equal to said inrush steady state current, $I_s$, or said inrush current is lower than said inrush steady state current, retrieving a hold current, $I_h$, where said hold current, $I_h$, is the steady state current through said electromagnetic coil, when said hold voltage, $V_h$, is applied to said electromagnetic coil, retrieving a hold current time, $T_h$, where said hold current time, $T_h$, is the time it takes for the current through said electromagnetic coil to go from zero current to said hold current, $I_h$, when the inrush voltage, $V_i$, is applied to said electromagnetic coil, measuring a test raise time, $T_{test}$, where said test raise time, $T_{test}$, is the time it takes for the current through said electromagnetic coil to go from said hold current, $I_h$, and to said inrush current, $I_i$, and determining that said movable element moved from said passive state to said active state or from said active state to said passive state when the sum of said hold current time, $T_h$, and said test raise time, $T_{test}$, is equal to said raise time, $T_i$, d) repeating steps a)-c) to determine one or more values of said hold voltage, $V_h$, for which said movable element was determined not to have moved and, optionally, one or more values of said hold voltage, $V_h$, for which said movable element was determined to have moved upon the subsequent application of said DC inrush voltage, $V_i$, e) selecting said operational hold voltage, $V_{oper}$, to have a value equal to or higher than the lowest value of said hold voltage, $V_h$, for which it was determined that said movable element did not move upon subsequent application of said DC inrush voltage, $V_i$, f) applying said operational hold voltage, $V_{oper}$, to said electromagnetic coil to maintain said movable element in said active state.

2. The method according to claim 1, wherein step e) further comprising selecting said operational hold voltage, $V_{oper}$, to be approximately 50 percent higher than the lowest value of said hold voltage, $V_h$, for which it was determined that said movable element did not move upon subsequent application of said DC inrush voltage, $V_i$.

3. The method according to claim 1, wherein said method further comprising a step of determining a resistance of said electromagnetic coil, $R_{coil}$.

4. The method according to claim 3, wherein said resistance of said electromagnetic coil is ohmic.

5. The method according to claim 1, wherein retrieval of said hold current time, $T_h$, comprising reading stored data values.

6. The method according to claim 1, wherein retrieval of said hold current time, $T_h$, comprises measuring said hold current time, $T_h$.

7. The method according to claim 1, wherein said actuator is a solenoid valve and said movable element is a plunger or piston.

8. The method according to claim 7, wherein said solenoid valve is part of the irrigation system.

9. The method according to claim 1, wherein the actuator comprises an irrigation valve comprising a solenoid and a piston.

10. A method of diagnosing an actuator for an irrigation system, comprising a movable element and an electromagnetic coil for generating a magnetic field for displacing said movable element along the axis of said electromagnetic coil, said movable element comprising a soft magnetic material, said actuator having an active state and a passive state, said movable element being closer to said electromagnetic coil when said actuator being in said active state than when said actuator being in said passive state, a hold voltage, $V_h$, being applied to said electromagnetic coil, said hold voltage being a constant DC voltage, said method comprising the following steps:

measuring a hold current, $I_h$, through said electromagnetic coil, said hold current, $I_h$, being the steady state current running through said electromagnetic coil when said hold voltage, $V_h$, is applied, retrieving values characterizing said electromagnetic coil and said movable element, including:

a DC inrush voltage, $V_i$, and a corresponding raise time, $T_i$, an inrush current, $I_i$, being dependent on said DC inrush voltage, $V_i$, said raise time, $T_i$, and a resistance, R, of said electromagnetic coil, where said inrush current, $I_i$, is the current running through said electromagnetic coil after said DC inrush voltage, $V_i$, has been applied to said electromagnetic coil for a time, $T_i$, from a time when zero voltage was applied to said electromagnetic coil, a hold current time, $T_h$, where said hold current time, $T_h$, is the time it takes for the current through said electromagnetic coil to go from zero current to said hold current, $I_h$, applying said retrieved DC inrush voltage, $V_i$, to said electromagnetic coil, while measuring the current through said electromagnetic coil as a function of time, determining a test raise time, $T_{test}$, being the time it takes for the current through said electromagnetic coil to reach the retrieved value of said inrush current, $I_i$, calculating a total raise time, $T_{raise,total}$, as the sum of said hold current time, $T_h$, and said measured test raise time, $T_{test}$, such that $T_{raise,total} = T_h + T_{test}$, determining when said total raise time $T_{raise,total}$ is equal to said raise time, $T_i$, and when so, concluding that said movable element moved due to the application of said retrieved DC inrush voltage, $V_i$, to said electromagnetic coil.

11. The method according to claim 10, wherein said actuator is a solenoid valve and said movable element is a plunger or piston.

12. The method according to claim 10, wherein said solenoid valve is part of an irrigation system.

13. The method according to claim 10, wherein retrieval of values characterizing said electromagnetic coil and said movable element in step b) comprising reading one or more stored data values.

14. The method according to claim 10, wherein retrieval of values characterizing said electromagnetic coil and said movable element in step b) comprising measuring one or more values.

15. The method according to claim 10, wherein said method further comprising the step:

reporting to a system or a user whether said movable element moved or not.

16. A method of controlling an actuator for an irrigation system, comprising a movable element and an electromagnetic coil for generating a magnetic field for displacing said movable element along the axis of said electromagnetic coil, said movable element comprising a magnetic material, said actuator having an active state and a passive state, said movable element being closer to said electromagnetic coil when said actuator being in said active state than when said actuator being in said passive state where the active state is obtained by applying a DC voltage to said electromagnetic coil;

the method comprises the steps:

1) applying a first DC voltage to said electromagnetic coil such that a current runs through said electromagnetic coil brings the actuator from the passive state to the active state, 2) applying a DC voltage lower than said first DC voltage and determine when the movable element moves, bringing the actuator from the active state towards the passive state, 3) repeating step 2) and determine a number of second DC voltages lower than said first DC voltage where the movable element does not move such that the actuator remains in the active state, 4) selecting and applying at least one of the second voltages to keep the actuator in the active state.

* * * * *